Figure 1:
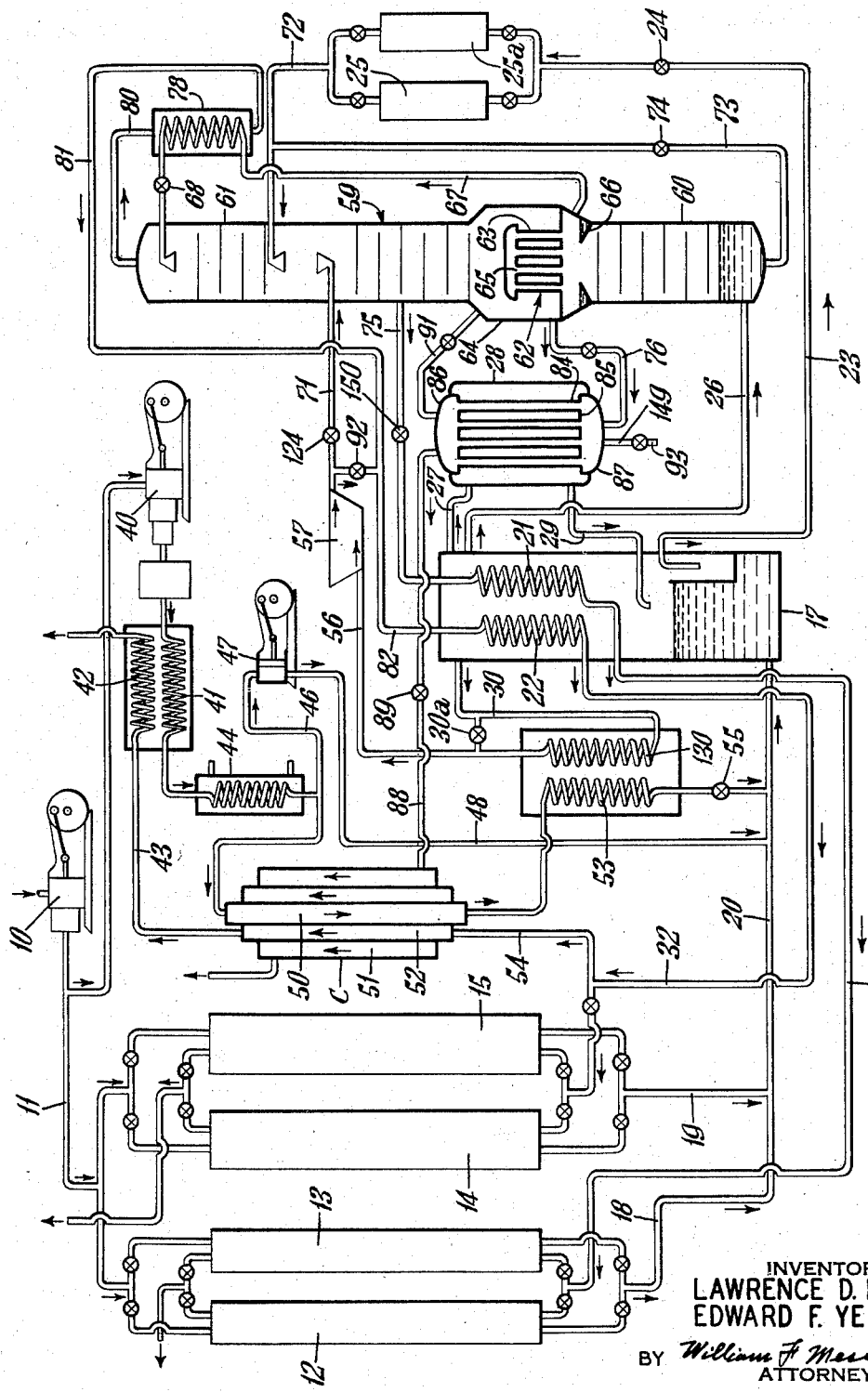

Feb. 17, 1959   L. D. POTTS ET AL   2,873,583
DUAL PRESSURE CYCLE FOR AIR SEPARATION
Filed May 4, 1954   2 Sheets-Sheet 1

INVENTORS
LAWRENCE D. POTTS
EDWARD F. YENDALL
BY William F. Mesinger
ATTORNEY

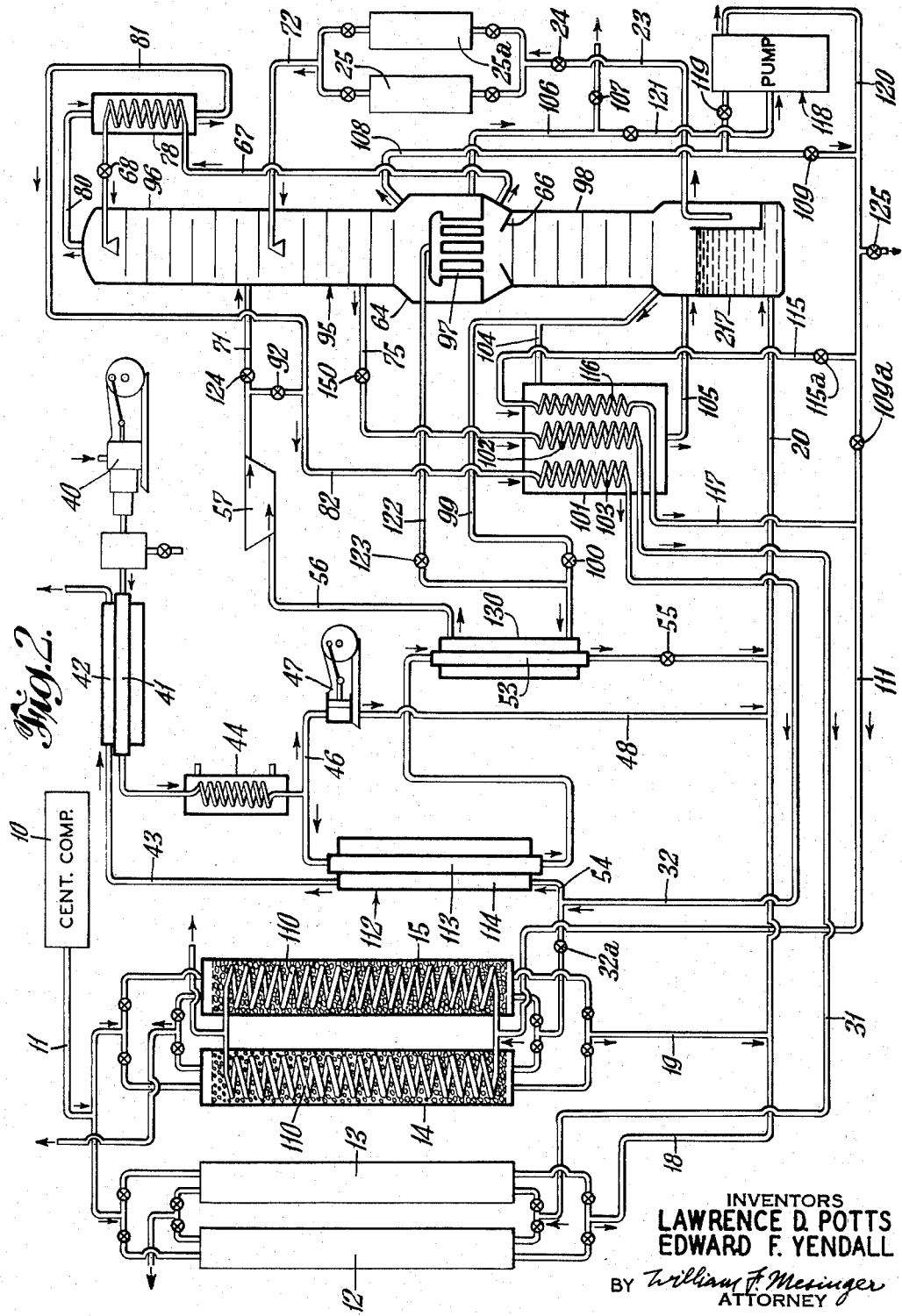

United States Patent Office 2,873,583
Patented Feb. 17, 1959

2,873,583

DUAL PRESSURE CYCLE FOR AIR SEPARATION

Lawrence D. Potts, Eggertsville, and Edward F. Yendall, Kenmore, N. Y., assignors to Union Carbide Corporation, a corporation of New York Application May 4, 1954, Serial No. 427,556

34 Claims. (Cl. 62—14)

This invention relates to a process and apparatus for separating low boiling gas mixtures, and more particularly concerns a dual pressure cycle for separating air into its major constituents for the production of varying amounts of liquid and gaseous oxygen, and of oxygen of different purities.

In the separation of air into its major constituents, it is desirable that the products of separation particularly the oxygen product should conform as closely as possible with the consumer's requirements as to purity, physical state and rate of consumption of the product. Heretofore, air separation plants for oxygen production were usually constructed to produce either liquid oxygen or gaseous oxygen. Plants constructed to produce both liquid and gaseous oxygen usually were inefficient and inflexible as to any variation in the proportion of liquid to gaseous production. Thus, high pressure air cycles of the Heylandt type can only produce liquid oxygen efficiently, while low pressure air cycles of the Frankl type are only efficient in the production of gaseous oxygen.

Frequently a customer's operations are so diverse that both liquid and gaseous oxygen at varying rates of production are required from a single air separation plant. Such flexibility of operation presents serious difficulties in building an efficient cycle.

Some users operations are so diverse that oxygen of both low purity (about 95%) and high purity (about 99.6% or higher) can be used economically. The relative demand rates for low and high purity oxygen may also vary. For example, a sudden change in operation schedules may necessitate a sudden rise or drop in the rate of high purity oxygen demand, a sudden rise or drop in the rate of low purity oxygen demand, or any combination thereof. Such changing production requirements present serious difficulties in resolving an efficient cycle that will meet all of these situations.

For efficient production of only high purity liquid oxygen, the systems or cycles of the so-called Heylandt type are commonly used. These require high initial air pressures and employ expansion with production of external work of a large portion of the high pressure air before it has been deeply cooled. An example is that of United States Patent 2,337,474.

For efficient production of only low purity gaseous oxygen a system of the so-called Frankl type has been employed, an example being that of United States Patent 2,002,941. In such cycles the initial air pressure is about 75 p. s. i. g., the air is cooled by cold accumulators, and refrigeration is produced by work expansion of a portion of deeply cooled air. A modification of the Frankl cycle has been proposed for producing liquid oxygen in which the increased refrigeration requirement is produced by work expansion of a major portion of the air as so-called excess air which cannot be subjected to separation thus sacrificing efficiency.

An improvement on the Frankl type cycle is the so-called Linde-Frank cycle in which a supplementary high pressure air stream is separately indirectly cooled and throttle expanded to the rectifying column for insuring the self-cleaning action of the cold accumulators. This may be termed a "dual-pressure cycle," in which the expansion of the high pressure stream provides the refrigeration requirement only for gaseous oxygen production and if rearranged for simultaneous liquid production such cycle would be inefficient and lack the desired flexibility.

A proposal to also produce some high purity oxygen with a Linde-Frankl low purity cycle for the main production is disclosed in United States Patent 2,514,391 which adds in auxiliary rectifying column with associated heat exchangers and compressor for compressing a portion of the low purity oxygen, cooling, liquefying, and rectifying it to produce high purity gaseous product. The latter cycle is also not adaptable for the efficient production of varying amounts of liquid and gaseous oxygen and for the high purity production it involves expensive complications and additional apparatus.

The present invention provides a new dual-pressure type cycle that avoids the limitations of prior cycles for efficiently and flexibly producing both liquid and gaseous oxygen in proportions desired and for also producing a desired amount of high purity gaseous oxygen as well as low purity oxygen while using a single two-stage rectifying column.

It is therefore an important object of the present invention to provide an improved dual pressure cycle for the separation of a gaseous mixture, such as air, from which both a liquid and gaseous product such as oxygen can be simultaneously and efficiently produced.

Another object of the present invention is to provide a novel dual pressure cycle for the separation of an air mixture which permits the operation of a single interchanger or rectifier apparatus over a wide range of gas demand loads.

Still another object of the present invention is to provide a novel dual pressure cycle for the separation of air into its constituent components, the cycle having the characteristics of flexible operation over a wide range of product demand, for simultaneously producing varying amounts of liquid and of gaseous oxygen of varying purity.

According to this invention it has been found that the processed quantities of high and low pressure air should be nearly proportional to the amounts of liquid and gaseous products for efficient operation. Thus, by varying the relative quantities of high and low pressure air processed, it is possible to accommodate production schedules in which the ratio of liquid to gas demand varies.

A preferred arrangement for varying the relative amounts of high and low pressure air supply is to use a booster compressor of variable capacity to process the high pressure air portion. The entire air supply is first compressed in a low pressure compressor, and a portion of the discharge as a low pressure stream is then passed to the low pressure air refrigeration system. The variable remainder is further compressed in the booster machine to provide the high pressure supply.

For maximum efficiency, the low pressure air stream is cooled and partially cleaned by heat exchange with the cold separation products in periodically reversed cold regenerators or cold accumulators. The high pressure portion is split into two streams in a manner similar to a Heylandt type cycle, one high pressure stream being indirectly countercurrently cooled at high pressure and the remaining stream processed in an expansion engine for the production of external work at the expense of internal energy. All of the air streams are processed together in a single scrubber for removal of residual carbon dioxide and other impurities, and a portion of the scrubbed gas is turbo-expanded to provide the low temperature refrigeration requirement of the process. The scrubber components and the rectification column may be combined if desired.

Among the further important features and advantages of the combination of cycle elements according to the invention are that:

(1) A high pressure air stream may be conveniently used to heat the air portion passing to the turbo-expander by countercurrent exchange. This eliminates complications such as the previously proposed necessity of using lower pressure regenerator air side bleed stream for this function. Thus, considerable economic saving is effected by the ability to use a smaller and less expensive pre-heat exchanger.

(2) The need for a regenerator air side bleed as proposed by Frankl is also avoided because the other reason for its use, namely to provide heat unbalance for self-cleaning of regenerators is provided by a simpler expedient. The present combination of the low and high pressure systems for supplying air to the column results in the passage of a quantity of cold rectification products through the regenerators adequately in excess of the quantity of air passing through the regenerators to insure that no deposits can accumulate. Thus, the conditions are such that the cold rectification products are able to completely sweep out all of the water and carbon dioxide deposited by the incoming air, the regenerators thus being self-cleaning in operation.

(3) The system also is well adapted to production of high purity gaseous oxygen. The cold high purity gaseous oxygen product portion may be warmed by indirectly countercurrent heat exchange with a stream of incoming high pressure air. Alternatively such warming may be effected by indirect heat exchange coils associated with the regenerators. In either case the high purity product is not contaminated by residual air.

(4) The new system is peculiarly adjustable for wide variations in gas demand rate by avoiding the difficulties such as are encountered in the operation of a simple Frankl low pressure oxygen cycle wherein, if the gas demand rate drops suddenly:

(a) Excess gas production can be vented to the atmosphere which involves a prohibitive operating cost, (b) Excess gas production can be stored as gas for future use which involves a prohibitive investment cost;

(c) The rate of air supply to plant can be reduced which is better from the standpoint of operating costs, but unfortunately there is a severe limitation to air supply rate determined by the air compressor or rectification column because most centrifugal air compressors cannot be operated below about 50 percent capacity, and because the rectifying column imposes the most important limitation on this mode of operation. Even if the air compression rate could be reduced to any desired level, the column would eventually process so little air that it would not function properly because of inadequate depth of liquid on trays, etc. This might occur, for example, at about 35 percent of rated air volume so that any drop in demand below 35 percent of the normal level would require storage or rejection of the excess gas.

(d) Excess air could be diverted to the turboexpander to make the excess product as liquid for storage as liquid oxygen. The method of liquid production by excess air expansion is more expensive than liquid production by a conventional high pressure Heylandt system. Another disadvantage is that most of turbine capacity is required for refrigeration of the incoming air, and little is left for liquid production.

An important advantage of the dual pressure cycle according to this invention is that all of the high pressure air eventually passes to the column, and none need be diverted to the turbo-expander so that sufficient high pressure air can be supplied to keep the column operating efficiently even when no gaseous oxygen product is being produced.

On the other hand, during periods of very high gaseous oxygen demand, the high pressure air system could be by-passed so as to permit usage of the full column operating capacity for oxygen gas production. It thus will be seen that the dual pressure cycle of this invention permits a wide operating range for gas production.

(5) The system provides for nearly continuous adjustment to meet changing gaseous oxygen demand rates. Even though the quantity of the high pressure air supply may be adjusted only in steps, the system is operable at intermediate demand rate points by varying the quantity of air through the turbo-expander. This means that at some demand rate points the system might not be performing at maximum efficiency, but the amount of liquid produced by the use of "excess air" type of operation can be held to relatively small amounts if enough "steps" are provided in the rate of high pressure air supply.

Further features of the invention are as follows: There is provided a side condenser which contributes to flexibly varying the liquid to gas ratio of oxygen output.

There is provided means for cooling a stream of high pressure air in multiple stages and incorporating novel means for warming a flow of scrubbed air vapor at a relatively lower pressure in one of said stages for subsequent expansion in an expander device, the state of the high pressure air prior to entering said one stage being such as to effect the desired warming of the amount of air vapor to be expanded.

Other objects, features and advantages of the present invention will be readily apparent from the following detailed description of certain preferred embodiments thereof taken in conjunction with the accompanying drawings in which:

Fig. 1 is a diagrammatic view of a dual pressure cycle for air separation illustrating the principles of the present invention; and Fig. 2 is a view substantially similar to Fig. 1 but showing a modified arrangement.

Referring now to Fig. 1, a gas mixture, for example ordinary atmospheric air, is introduced into the system at two different pressure levels, a low pressure between 60 to 100 p. s. i. g., preferably about 75 p. s. i. g., and a high pressure between 1000 to 3000 p. s. i. g., preferably about 2000 p. s. i. g. Preferably, the entire air supply is first compressed by a compressor unit 10 and discharged at a relatively low pressure of approximately 75 p. s. i. g. Part of this low pressure air enters the refrigeration-separation system through an air inflow pipe 11, the remainder in an amount required being further compressed to a relatively high pressure for subsequent introduction into the separator system, as will appear hereinafter.

Inasmuch as gaseous impurities in the air having boiling points higher than oxygen will freeze at the temperatures employed in the liquefaction and rectification of the air, and in so doing obstruct and hinder the continuity of the air separation cycle, the present invention cools the low pressure portion of the air and reheats products of the separation in periodically reversed cold accumulators or regenerators 12, 13, 14 or 15. During such cooling of the air, the moisture and carbon dioxide content is deposited as a solid in the form of ice or frost along the inner surface areas of the regenerators, and after the "reversal" of the regenerators the frozen deposition is removed by the products of separation flowing in the opposite direction.

As illustrated, four regenerators are used although a larger or smaller number may be used, the regenerators 12, 13, being preferably cooled by a separated oxygen gas product, and the regenerators 14, 15, being preferably cooled by separated nitrogen gas.

For completely removing any carbon dioxide that may still be present in the air, the air is further cleansed in a suitable scrubber or washer apparatus 17 before entering the interchanger equipment. To this end, the regenerator cooled air is delivered through regenerator air conduits 18 and 19 to a scrubber inlet conduit 20 and then conducted into the lower portion of the scrubber unit 17.

The scrubber apparatus 17 is of usual construction comprising an elongated, generally cylindrical container having a liquid collecting space at its bottom end and condenser or liquefier coils 21 and 22 in the gas space above, the liquefier coils containing separated gas products, oxygen and nitrogen respectively. The regenerator cooled air is delivered into the scrubber unit 17 at or near its bottom, and passed through a bath of scrubber liquid consisting of oxygen-rich liquefied air. This scrubber liquid is sent through a scrubber liquid line 23 controlled by throttling valve 24 and made to flow through an impurity removal system including a filter 25 to remove solid impurities including carbon dioxide particles. A reserve filter 25a bypasses the filter 25 and affords convenient means for allowing cleaning of or removal and replacement of filter 25 without interrupting the flow of scrubber liquid. The liquefier coils 21 and 22 produce liquid for scrubbing the incoming air by condensing a portion of the scrubbed air.

A portion of the clean vapor in the scrubber unit 17 is sent through a scrubbed air vapor outlet conduit 26 to the rectifying column and another portion preferably may be sent through a vapor line 27 into a condenser 28 for heat exchange purposes where it eventually condenses and returns by a return line 29 to the scrubber unit 17 as liquid air, and in this instance as make-up liquid.

The remaining portion of the clean, scrubbed vapor in the scrubber unit 17 is routed through a conduit line 30 to perform thermodynamic functions, such as cooling and refrigeration production by expansion, to increase the efficiency of the air separation cycle, and is subsequently delivered in whole or in part into the rectification as will be apparent later.

The oxygen and nitrogen products of separation in coils 21 and 22 are connected with the lower or cold ends of the oxygen regenerators 12 and 13 and the nitrogen regenerators 14 and 15, respectively, by means of the conduits 31 and 32.

A compressor 40 of variable capacity receives low pressure air at its intake end from pipe 11 at a pressure of approximately 75 p. s. i. g. and discharges it at a relatively higher pressure ranging from 1200 p. s. i. g. to 3000 p. s. i. g.; preferably about 2000 p. s. i. g. to a precooler passage 41 for heat exchange with a counterflowing portion of separated nitrogen in pre-cooler passage 42 delivered thereto by conduit 43.

A further stage of cooling of the high pressure compressed air is accomplished in a conventional type externally refrigerated forecooler 44 where the temperature of the high pressure air is reduced to approximately −40° C. Ammonia, carbon dioxide, and Freon-22 are examples of commercially available refrigerants that may be used. Such forecoolers are usually installed in duplicate so that moisture frozen out of the air can be removed by thawing one unit while the other is in operation.

From the forecooler 44, the high pressure air is divided into two streams, one stream being conducted by a high pressure air conduit 46 to a reciprocating expander cylinder 47 where it is expanded to the lower pressure, about 75 p. s. i. g. and discharged to a conduit 48, which joins the low pressure compressed air in the scrubber inlet line 20 to augment the supply of air to be cleansed of impurities in the scrubber unit 17. The remaining stream of the divided high pressure compressed air is delivered to a passage 50 in a countercurrent heat exchanger C where the air is cooled in heat exchange with cooling passages 51 and 52, containing respectively counterflowing high purity oxygen and effluent nitrogen gas products.

In the arrangement shown in Fig. 1, a major part of the separated gaseous nitrogen in conduit 32 is used for cooling the relatively low pressure regenerator air. The remaining and minor part of the separated nitrogen gas is used for cooling part of the high pressure air. Consequently, the mainstream of the nitrogen gas in conduit 32 flows to the regenerators 14 and 15 and the minor stream flows through a countercurrent inlet branch conduit 54 which connects to the pass 52. After being warmed in the countercurrent pass 52 by cooling the air in pass 50, the nitrogen is delivered to the precooler passage 42 by the nitrogen gas product conduit 43, after which the warmed nitrogen may be further used or simply discharged into the atmosphere.

Additional means for further cooling of the high pressure air stream leaving the countercurrent pass 50 are provided. For this purpose, such high pressure air stream is introduced into a turbine preheat exchanger passage 53, where through heat interchange with the cold scrubbed air vapor in the conduit 130, the temperature of the air is still further reduced. This cooled high pressure air is then expanded through a valve 55 to 75 p. s. i. g. to further augment the supply of low pressure air in the scrubber inlet line 20.

The heated scrubbed air vapor leaving the turbine preheat exchanger 130 is conducted by a conduit 56 to the inlet of an expander turbine 57. External work obtained from the turbine is preferably used as by suitable linkage coupling the turbine to an electric generator. The refrigeration produced is utilized in the system.

Owing to the possibility that some of the air may liquefy in the turbine during expansion, the air to be expanded is preheated in the turbine preheater to a temperature such that the turbine exhaust is as close as possible to and not below its dry saturation temperature. When necessary, clean air from the scrubber conduit 30 may be directly fed to the turbine 57 by a valved by-pass 30a for better control of the temperature.

Rectification of the liquid and gaseous air is accomplished in a conventional rectification column 59 which can be of a relatively large size. As shown in Fig. 1, the rectification column 59 is of the usual double-column type comprising a lower elongated high pressure rectification column chamber 60, an upper elongated low pressure rectification column 61, disposed above the lower column, and a main condenser 62 sealing the high pressure chamber 60 from said low pressure upper rectification column. The main condenser 62 is provided with vertical tubes 63, disposed in an oxygen collecting chamber 64 in the lower part of the upper column, the lower ends of these tubes being in communication with the upper end of the rectification chamber 60 and the upper ends thereof opening into a sealing dome 65. An annular shelf tray 66 positioned below the outer condenser tubes 63 collects high purity liquefied nitrogen from the outer tubes of the condenser.

Part of the nitrogen liquid is delivered by a nitrogen transfer conduit 67 controlled by a throttling valve 68 to the upper end of the upper column 61 to form a reflux liquid for the upper column. The remaining liquid nitrogen drops back into the upper end of the lower column 60 to provide a liquid reflux therefor.

A first stage of rectification of the scrubbed air in the rectification chamber 60 is accomplished in a conventional manner to provide substantially pure liquid nitrogen for withdrawal at conduit 67 and a liquid at the bottom of chamber 60 substantially enriched in oxygen. These liquids are passed as feeds to the upper column together with cleaned scrubber liquid and refrigerated clean air vapor from the exhaust of the turbine 57 which, in adjustable amount, is supplied to the upper rectification column 61 through a vapor inlet conduit 71 at an intermediate point of the upper column. The scrubber liquid in a conduit 72, previously filtered by a filter 25, and augmented by the oxygen-enriched air from the lower column through a transfer line 73 having an interposed throttling valve 74, is admitted to the upper column between the liquid nitrogen and air vapor inlet conduits 67 and 71 respectively.

As a result of the rectification process in the upper column 61, a low purity oxygen gas containing approximately 95% oxygen may be extracted near the bottom of the upper column from a point several trays above the chamber 64 through an oxygen removal line 75. Practically pure liquid oxygen, surrounding the main condenser 62, is produced and accumulated in the chamber 64 from which it may be extracted, as by means of a liquid oxygen line 76, and led into the side condenser 28.

The gaseous nitrogen effluent resulting from the rectification process in the upper column 61 is removed from the top of the column via nitrogen gas line 80 and sent to the nitrogen transfer heat exchanger 78, where it is heated against the counter-flowing, higher pressure liquid nitrogen in the conduit 67. At the same time, the liquid nitrogen in the nitrogen transfer line 67 is further cooled prior to its expansion through throttling valve 68.

The nitrogen gas leaving the nitrogen heat exchanger 78 passes through pipe runs 81 and 82 to the liquefier coil 22 in the scrubber unit 17 in order to utilize its cooling effect, and at the same time superheat it, to insure maximum regenerator efficiency.

The side condenser 28 comprises a large number of parallel, narrow metal tubes 84 preferably copper, held together by perforated tube sheets 85 disposed at the tops and bottoms of the tubes. Above the tubes 84 is a copper dome 86 with a high purity oxygen gas line 88 for receiving evaporated oxygen gas from the side condenser. Below the tubes 84 is a sump or oxygen chamber 87 adapted to receive liquid oxygen from the high purity liquid oxygen conduit 76. Oxygen is evaporated and passed through the tubes 84 of the side condenser and into the dome 86 by introducing scrubber air vapor in conduit 27 into the space around the tubes between the plates 85 and boiling the liquid oxygen held in the sump 87 of the condenser.

Although the above description contemplates the use of scrubbed air outside the tubes 84 and liquid oxygen in the oxygen chamber 87, the side condenser is equally susceptible of use in the reverse manner, that is scrubbed air inside the tubes and liquid oxygen outside. Alternatively, provision may be made for using lower column nitrogen gas in lieu of scrubbed air vapor for vaporizing the liquid oxygen in the side condenser, or the side condenser 28 could be omitted and its function taken over by the main condenser 63 which would then need to be correspondingly enlarged.

High purity gaseous oxygen of about 99.5% oxygen content or higher leaving the dome 86 of the side condenser is passed through line 88, having a control valve 89 interposed therein to and through the high purity oxygen warming pass 51 to pre-cool the entering high pressure air in the counter-current heat exchanger pass 50, thereby recovering a major part of the refrigeration of the cold, high purity gaseous oxygen.

It will be noted that under starting up conditions the vapor expanded in the turbine 57 may not be entirely free of deleterious matter such as carbon dioxide since the initial refrigeration and scrubber liquid available in the scrubber unit 17 is insufficient to remove such impurities. Because of this, some carbon dioxide could find its way into the rectification apparatus and eventually foul the separation process. To the end that such a condition may be avoided during starting up procedure, a shut-off valve 124 and a by-pass controlled by valve 92 are provided for diverting and re-routing the turbine cooled air in conduit 71 through nitrogen gas line 82, coil 22 and out through the nitrogen regenerators 14 or 15 as waste gas. As soon as sufficient refrigeration and liquid are available in the scrubber unit 17 and reasonably steady state conditions have obtained therein so that a supply of clean vapor from the dome portion thereof is assured, the valve 124 may be opened and the clean turbine expanded vapor in the conduit 71 sent directly into the upper rectification column 61.

With the valve 92 closed and valve 124 open, the system will be in operating condition for the production of a maximum proportion of gaseous oxygen. If only the low pressure air system is being utilized with no liquid production, the liquid transferred from the main to the side condenser should preferably be circulated through a $CO_2$ and hydrocarbon adsorbent trap (not shown), preferably one containing silica gel.

For a high liquid oxygen production rate and a low gaseous oxygen production rate, the flow of gas in the lines 88 and 75 may be reduced respectively by throttling valves 89 in the line 88 and valve 150 in the line 75, which respectively control the high and low purity gaseous oxygen production. Liquid oxygen in the sump 87 may be withdrawn preferably from the bottom of the side condenser 28 by means of a high purity, valve-controlled, liquid oxygen conduit 93. Alternatively, liquid oxygen can be withdrawn from the main condenser chamber 64. During high liquid oxygen production rates, the upper column 61 processes a larger quantity of gas and due to the column's limited capacity, the back pressure on the expansion turbine 57 may be raised. This situation is undesirable as it reduces the refrigeration produced in the turbine; consequently by-pass valve 92 is opened to divert some or all of the expander air thus lowering the turbine back pressure and increasing the turbine refrigeration. This mode of operation produces a proportionately larger amount of liquid air in the liquefier portion of scrubber 17, thus partially compensating for the refrigeration withdrawn in the liquid oxygen product.

Should simultaneous production of liquid and gaseous oxygen be desired, these products may be conveniently extracted at the same time from their respective conduits 75, 88, and 149 in any amount which may be desired by suitable adjustments of the nozzle valves on turbine 57, by-pass 92 and valves 150, 89, and 93 respectively.

It will be observed that in the instant arrangement of the dual cooling stages 50 and 53, these are definite limitations on the operating conditions. The portion of the 75 p. s. i. g. scrubbed gas not needed by the column to maintain the optimum purities is expanded in turbine 57 for the production of external work. As was previously mentioned, it is desirable to heat this scrubbed gas with high pressure air in coil 53 thus avoiding subsequent liquefaction in the expansion turbine 57. Consequently a sufficient amount of high pressure air must be circulated to properly warm the oxygen and nitrogen in passes 51 and 52 respectively of countercurrent heat exchanger C, and the scrubbed gas in coil 130. The proper distribution of the high pressure air is maintained by work expanding the remainder in engine 47.

A modification shown in Fig. 2 incorporates the functions of the scrubber unit 17 and the side condenser 28 as part of a double rectification column.

Referring to the drawings, Fig. 2 illustrates a double rectification column 95 having an upper column 96, a main condenser 97 and a lower column 98 substantially similar to those shown in Fig. 1. However, the lower column 98 is extended in order to provide the essential features for proper scrubber action. By this arrangement, instead of directing the refrigerated air vapor in the conduit 20 into a scrubber unit, the air may be passed through a scrubber bath consisting of oxygen rich liquid air in the extended or kettle portion of the lower column 98 by simply admitting the air directly into the bottom thereof. This air passes through the scrubber liquid and emerges as clean scrubbed air vapor which may be rectified as it travels up the column in precisely the same manner as the air vapor in the lower column 60 shown in Fig. 1. The main advantage of the integral scrubber lower column is lower fabricating costs.

In addition, the lower column fulfills its scrubber functions by supplying scrubber liquid to the upper column 96 through a conduit 23 having a control valve 24 and filter system 25, 25a similar to Fig. 1.

By comparison with Fig. 1 it is also seen that scrubbed air vapor for the turbine preheat exchanger 53 is supplied by an air vapor conduit 99 having a control valve 100, the conduit 99 connecting with the lower column. A portion of the clean vapor in conduit 99 is diverted through a branch line 104 into a liquefier 101 having oxygen and nitrogen liquefier coils 102 and 103 corresponding to the liquefier coils 21 and 22 in Fig. 1, and delivering the condensed makeup liquid into the lower column through a return line 105 by gravity feed. The purpose of the liquefier 101 is generally directed toward effecting sufficient superheating of the separation products for efficient operation of the regenerators 12, 13, 14 and 15, and is separated from sump 217 for structural convenience.

Low purity gas is withdrawn from the upper column 96 by the oxygen extraction line 75 as in Fig. 1, and conducted to the liquefier coil 102 where it is sufficiently warmed for subsequent passage through conduit 31 to the oxygen cooled regenerators 12 and 13.

As a convenient means for producing high purity oxygen in the liquid or gaseous phase in the absence of side condenser means for rendering such functions, high purity liquid oxygen is removed in adjustable amount from the bottom of chamber 64 of the upper column 96, as by means of a conduit 106 controlled by a valve 107, and high purity gaseous oxygen is drawn from the upper column 96 at a point positioned as close to and above the liquid oxygen level in chamber 64 through a high purity gas conduit 108.

The high purity gas in the line 108 is used in a different manner in its capacity as a coolant from its counterpart in the line 88 of Fig. 1. In this instance, instead of being sent through a 3-pass countercurrent heat exchanger, such as the countercurrent pass 50 in Fig. 1, the high purity oxygen is passed in heat exchange with the nitrogen cooled regenerators 14 and 15 through the medium of cooling coils 110, preferably one for each regenerator, buried in the regenerator storage mass by means of a high purity oxygen line 111 connected with the conduit 108 and controlled by valves 109 and 109a. Alternatively, the oxygen coils could be externally wrapped around the regenerator shell. The oxygen flow in the cooling coils 110 may be either continuous, or provision may be made for alternatingly switching the flow between the regenerators 14 and 15. In the instant embodiment a continuous flow of oxygen in the cooler coils 110 is preferred.

It will be observed that because of the use of the high purity oxygen gas as a supplementary coolant in the regenerators 14 and 15, the need for a 3-pass countercurrent heat exchanger, such as for example heat exchanger 50 in Fig. 1, is made unnecessary. Accordingly, in the cycle shown in Fig. 2, such heat exchange means are replaced with a cheaper and more efficient 2-pass countercurrent heat exchanger 112 in which high pressure air from the forecooler 44 is cooled in pass 113 against the counterflowing separated nitrogen gas product in the line 54 flowing in pass 114. It will be further observed that due to the use of the auxiliary oxygen coolant in the regenerators 14 and 15, the amount of the nitrogen gas stream flowing through the regenerators 14 and 15 may be reduced, and the flow rate in the pass 114 increased accordingly.

As an alternative for feeding the high purity oxygen gas directly to the passages 110 in the regenerators, and more particularly to avoid the possibility of partial oxygen liquefaction in the regenerator cooling coils, the high purity gas in line 108 may be warmed to approximately the temperature of the regenerator nitrogen by providing a branch conduit 115 having valve 115a which by-passes the control valve 109a and connects with one end of a liquefier coil 116 in the liquefier 101, the other end of the coil 116 being joined on the opposite side of valve 109a with the conduit 111 by a line 117. By regulating valve 109a, part or all of the high purity oxygen may be directed through the liquefier 101 and warmed along with the oxygen and nitrogen gas in coils 102 and 103 to a suitable temperature for subsequent warming in the regenerators 14 and 15.

In the event that high purity liquid or gaseous products are desired at a pressure higher than that existing in the upper column 96, machine 118 may be provided to receive these low temperature products at a low pressure and deliver them at a higher pressure. If a high pressure liquid product is desired, then machine 118 would comprise a pump, preferably of the reciprocating immersion type. In this case, liquid passes through valve controlled line 121 to the pump suction at low pressure (3–20 p. s. i.), and is discharged at a higher pressure (25–3000 p. s. i.), through line 120 leading to withdrawal valve 125. If a higher pressure gas product is desired the machine 118 may comprise a gas compressor and the low pressure gas from line 108 would be by-passed around valve 109 by connection 119 to compressor 118 from which it is discharged at a higher pressure and then directed through the refrigeration system as previously described.

Alternatively and preferably when high purity gaseous oxygen at high pressure is desired, the machine 118 would comprise a liquid pump as previously described, the by-pass 119 being provided to vent vapors developed in the pump, back to the chamber 64. Instead of delivery of liquid at connection 125, the high pressure oxygen is passed through open valve 109a, conduit 111, and heating passage 110 to be delivered therefrom as high pressure high purity oxygen product.

The means of varying the relative quantities of liquid and gas output in Fig. 2 are substantially the same as Fig. 1 except that there is incorporated an alternate means of withdrawing scrubbed gas from the column for subsequent preheating and turbo-expansion. Such means comprise a nitrogen gas line 122 venting uncondensed nitrogen gas from the dome of the main condenser 97 and valve 123 for controlling the flow of said gas into the turbine preheat coil inlet line 99. A possible advantage of this mode of operation is the greater assurance of clean gas entering the turbine, whereas there could possibly be some $CO_2$ or hydrocarbon carry over if the gas is withdrawn at a lower point in the column, such as line 99. On the other hand a slight loss of separation efficiency may be incurred.

To increase the liquid production and reduce the gaseous oxygen production rates more turbine inlet nozzle valves are opened. The valve 92 may be opened sufficiently to by-pass a desired proportion of expanded air to the line 82 thus lowering the turbine back pressure. At the same time low purity gas production is reduced by partly closing valve 150 and high purity gaseous oxygen production is reduced as required by partly or completely closing valve 89 or valve 109. The desired liquid production is withdrawn at valve 93 (Fig. 1) or through line 106 (Fig. 2) by regulating valve 107 or by operating pump 118 (Fig. 2) to draw liquid from conduit 121 and discharge it at a desired pressure through pipe 120 and connection 125. Conversely liquid production is reduced and gaseous production increased by regulating the valves oppositely. In either case in Fig. 2, the vapor for reheating in exchanger pass 130 and expansion by turbine 57 may be withdrawn from the high pressure chamber 98 of the column by either conduit 99 or conduit 122.

Either embodiment can be adjusted for operation to produce oxygen only as liquid by operation of the high pressure compressor 40 at maximum volume and high pressure, closing off the oxygen regenerators 12 and 13, opening wide the expanded air by-pass valves 92, closing the valves 124, closing the gaseous oxygen valves 150, 89, or 109 (Fig. 2) and withdrawing the liquid oxygen product at 93 (Fig. 1) or 107 (Fig. 2). When in Fig. 1, the high purity oxygen valve is closed, the oxygen that is evaporated in tubes 84 of the condenser 28 all passes back to the column 61 through pipe 91. Such operation reduces the amount of low pressure air and increases the amount of high pressure air processed. To balance the heat exchange the proportion of effluent nitrogen passed through the countercurrent exchanger pass 52 (Fig. 1) or 114 (Fig. 2) is increased while the nitrogen passed through the regenerators is decreased by adjusting the valve 32a in the branch of conduit 32 connecting to the nitrogen regenerators 14 and 15.

The immediately above described mode of operation can be modified to also produce some high purity gaseous oxygen by merely opening valve 89 (Fig. 1) or valve 109 (Fig. 2) to pass high purity gaseous oxygen at the desired rate and slightly adjusting the opening of valve 32a to adjust the heat exchange conditions.

For the maximum gas production and a low liquid production the compressor 40 is operated at a low volume and at a lower discharge pressure, for example 1200 p. s. i. g. The low pressure air is cooled in both oxygen and nitrogen regenerators. A reduced proportion of the 1200 p. s. i. g. air is expanded in the expander 47 to insure adequate heating of the turbine air in exchanger pass 130. The quantity of air expanded by turbine 57 is reduced by closing some of the nozzle valves and all of the discharge is delivered to the rectifying column by opening valve 124 and closing by-pass valve 92. The low purity oxygen valve 150 is open and the high purity gaseous oxygen valves 89 or 109 are adjusted to withdraw the desired proportion of high purity oxygen. The liquid oxygen valves 93 (Fig. 1) or 107 (Fig. 2) are adjusted to withdraw a small amount of liquid oxygen to maintain a proper liquid level in the chamber 64 of the rectifying columns. The heat exchange is balanced by regulation of valve 32a.

While it is desirable to withdraw at least a small amount of liquid oxygen, the liquid production could be reduced to an immaterial amount at a slight sacrifice of overall efficiency by still further reducing the proportion of air compressed to the higher pressure and correspondingly increasing the low pressure air stream. It is necessary in the embodiments shown, to provide enough air through the heat exchanger pass 53 to provide the heat requirement for the turbine air heating passage 130.

Maximum total production of oxygen is obtained with the production of a desired proportion of the total oxygen as high purity oxygen, a production rate of low purity oxygen of almost 90% as much as in the previous example and a production of a small amount of liquid oxygen. Approximately the same amount of the air is compressed to the higher head pressure of about 2000 p. s. i. g. which will provide the increased low temperature refrigeration for the increased liquid production. In such case the turbine expanded air is partly sent to the rectifying column and partly by-passed by regulation of valves 124 and 92, the proportion being over 2 to 1. Also a larger total amount of air is expanded by the turbine.

To illustrate the flexibility and adaptability of the system to various demands for oxygen products, four examples of operating conditions are set forth in the form of the following table:

| Item | Case 1 | | Case 2 | | Case 3 | | Case 4 | |
| --- | --- | --- | --- | --- | --- | --- | --- | --- |
| | Volume | Pressure | Volume | Pressure | Volume | Pressure | Volume | Pressure |
| a. At 11 | 2,200 | 85 | 2,200 | 75 | 2,200 | 82 | 2,200 | 79 |
| b. At 19 | 1,306 | 85 | 1,829 | 75 | 1,560 | 82 | 1,357 | 79 |
| c. At 18 | None | | None | | 269 | 82 | 300 | 79 |
| d. At 41 | 825 | 2,000 | 275 | 2,000 | 275 | 2,000 | 275 | 1,200 |
| e. At 48 | 389 | 83 | 110 | 74 | 153 | 76 | 89 | 73 |
| f. At 50 | 436 | 2,000 | 165 | 2,000 | 122 | 2,000 | 186 | 1,200 |
| g. At 20 | 2,131 | | 2,104 | | 2,104 | | 1,932 | |
| h. At 26 | 625 | 79 | 355 | 68 | 1,137 | 75 | 1,137 | 72 |
| i. At 56 | 1,054 | 79 | 1,503 | 69 | 571 | 75 | 444 | 73 |
| j. At 73 | 226 | | 164 | | 534 | | 534 | |
| k. At 72 | 452 | | 246 | | 396 | | 351 | |
| l. At 67 | 385 | | 185 | | 600 | | 602 | |
| m. At 71 | None | | None | | 399 | 7 | 444 | 6 |
| n. At 92 | 1,054 | 10 | 1,503 | 8 | 172 | | None | |
| o. At 75 | None | | None | | 283 | | 315 | |
| p. At 88 | None | | None | | 31 | | 35 | |
| q. At 93 | 209 | | 117 | | 69 | | 34 | |
| r. At 81 | 854 | | 478 | | 1,546 | | 1,547 | |
| s. At 32 | 1,908 | | 1,981 | | 1,718 | | 1,547 | |
| t. At 54 | 551 | | 67 | | 114 | | 158 | |
| u. At 32a | 1,372 | | 1,920 | | 1,606 | | 1,390 | |
| v. At 31 | None | | None | | 283 | | 315 | |

*Case 1.*—For all high purity liquid oxygen and no high or low purity gaseous oxygen production with the high pressure air compressors operating at 2000 p. s. i. g. discharge and three times the rate of cases 2, 3, and 4, the rectification column being operated at a moderate production rate.

*Case 2.*—For all high purity liquid oxygen and no high or low purity gaseous oxygen production with the high pressure air compressors operating at 2000 p. s. i. g. discharge and one-third the rate of case 1, the rectification column being operated at a low production rate.

*Case 3.*—For about 18% high purity oxygen liquid, 8% high purity oxygen gas, and 74% low purity oxygen gas production, the high pressure air compressors operating at 2000 p. s. i. g. discharge and one-third the rate of case 1, the rectification column being operated at a high production rate.

*Case 4.*—For about 9% high purity oxygen liquid, 9% high purity oxygen gas, and 82% low purity oxygen gas production, the high pressure air compressors operating at 1200 p. s. i. g. discharge and one-third the rate of case 1, the rectification column being operated at a high production rate.

In the table, the items *a* to *v* refer to designated points in the cycle briefly explained as follows, the flow being given in exemplary rounded numbers representing comparative flows in cubic feet per unit of time in terms of gas at n. t. p., the pressures being in pounds per square inch gage (p. s. i. g.), the production rates being gross figures.

a. Total air input compressed to the pressure of low pressure air stream.
b. Air after passing through nitrogen regenerators 14 and 15.
c. Air after passing through oxygen regenerators 12 and 13.
d. Portion of air further compressed to pressure of high pressure air streams.
e. Portion of high pressure air expanded by engine 47.
f. High pressure air stream that is cooled at 50 and 53 and throttled at valve 55.

g. The total input air of all streams that enter scrubber 17 (approximate total of b, c, e, and f, or of h, i, and k).
h. Scrubbed air vapor that is passed to lower column 60.
i. Scrubbed air portion that is reheated at 130 and passed to turbo-expander 57.

The feeds into the upper or low pressure rectifying column 59:

j. Crude oxygen from lower chamber 60.
k. Scrubber liquid from 17 after cleaning by filters 25.
l. Liquid nitrogen transferred from shelf 66.
m. Expanded air from turbo-expander 57.
n. Portion of expanded air by-passed through valve 92 to the effluent nitrogen line 82.

Products out of upper column 59:

o. Low purity (95%) gaseous oxygen at line 75.
p. High purity (99.5%) gaseous oxygen withdrawn through line 88.
q. Liquid oxygen (99.5% purity) withdrawn through valve 93.
r. Effluent nitrogen from top of column.
s. This is the sum of the excess air n and nitrogen effluent r.
t. The portion of the combined effluent which is passed through the countercurrent heat exchanger passage 52 as regulated by valve 32a.
u. The portion of the combined effluent passed through the nitrogen regenerators 14 and 15.
v. The low purity oxygen that is passed through the oxygen regenerators 12 and 13.

The above examples are applied to the system of Fig. 1, but they can similarly be applied to the modified system of Fig. 2. In both embodiments the compressor 40 could be arranged to increase the high pressure air pressure above 2000 p. s. i. g. to, for example, 3000 p. s. i. g. in which case the use of a forecooler 44 can be dispensed with. Also the ability to increase the high pressure can be employed when it is desired to increase the proportion of oxygen production as liquid. The ratio between the volume of high pressure air to low pressure air used depends upon production requirements. For an exemplary installation, the amount of high pressure air ranged from 12% to 40% of the total air processed.

It will be seen that an important advantage of the present systems is in the ability to adjust the proportions of the low pressure air stream to high pressure air streams and the pressure of the latter in accordance with the requirements for the oxygen products in the gaseous state to the requirement for liquid oxygen.

What is claimed is:

1. In a process for the separation of a gas mixture by low temperature rectification in a multipressure cycle in which portions of the gas mixture are provided at a condensation pressure and at a high pressure, the steps comprising cooling the condensation pressure portion by heat exchange with a portion of the separation products to a temperature close to its condensation temperature; cooling one part of the high pressure portion by expansion with production of external work to about said condensation pressure; cooling the other part of the high pressure portion by a heat exchange including heat exchange with another portion of the separation products to a low temperature and expanding the thus cooled other part to about said condensation pressure; effecting partial liquefactions of the vapor portions of the resulting streams at about the condensation pressure to provide liquid feeds for the rectification and a vapor remainder; superheating said vapor remainder to a temperature such that after work expansion thereof to rectification pressure it is in about the dry saturated state at the rectification pressure; expanding the superheated vapor with production of external work; providing for the passage at will of desired amounts of such expanded vapor to the rectification and to join with the effluent lower boiling product of the rectification; withdrawing from the rectification at a rate adjustable between a high rate and zero, a gaseous separation product containing mainly the higher boiling component of the gas mixture; and withdrawing from the rectification at a controlled rate adjustable between a low and a high rate, a liquid separation product containing mainly the higher boiling component of the gas mixture.

2. Process for the separation of a gas mixture according to claim 1 which includes the steps of relatively and approximately adjusting the proportion of gas mixture supplied at high pressure to that provided at the condensation pressure in accordance with the proportion of the rate of liquid separation product withdrawal to the rate of gaseous higher boiling separation product withdrawal.

3. Process for the separation of a gas mixture according to claim 1 in which said superheating of the vapor remainder is effected by heat exchange with said other part of the high pressure portion before it is expanded.

4. Process for the separation of a gas mixture according to claim 1 in which all of said expanded vapor is passed to the rectification and none is passed to said effluent; that rate of withdrawal of liquid separation product is adjusted to a low rate; the rate of withdrawal of gaseous higher boiling separation product is adjusted to a high rate; and the gas mixture supplied at high pressure is at a pressure not above 2000 p. s. i. g.

5. Process for the separation of a gas mixture according to claim 1 in which all of said expanded vapor is passed to the rectification and none is passed to said effluent; the rate of withdrawal of gaseous higher boiling separation product is adjusted to a high rate; the rate of withdrawal of liquid separation product is adjusted to a substantial rate; and the gas mixture supplied at high pressure is at a pressure no less than 2000 p. s. i. g.

6. Process for the separation of a gas mixture according to claim 1 in which all of said expanded vapor is passed to said effluent and none is passed to the rectification; the rate of withdrawal of gaseous higher boiling separation product is adjusted to zero; the rate of withdrawal of liquid separation product is adjusted to equal the total of such product produced; and the gas mixture supplied at high pressure is at about 2000 p. s. i. g. or higher.

7. Process for the separation of a gas mixture according to claim 1 in which all of said expanded vapor is passed to said effluent and none is passed to the rectification; the rate of withdrawal of gaseous higher boiling separation product is adjusted to zero; the rate of withdrawal of liquid separation product is adjusted to equal the total of such product produced; and the gas mixture supplied at high pressure is at about 2000 p. s. i. g. to 3000 p. s. i. g. and proportionately at such higher amount that the rectification is operated at maximum capacity for producing the liquid product at maximum rate.

8. Process for the separation of a gas mixture according to claim 1 in which at least a minor amount of the gaseous higher boiling separation product withdrawn is withdrawn from the rectification at a point where the composition is highest in the desired component and the balance is withdrawn from the rectification at a point where the composition is lower in the desired component.

9. In a process for the separation of air by low temperature rectification in which air is supplied in two streams, one air stream being supplied at a condensation pressure of between 60 and 100 p. s. i. g. and cooled to low temperature by heat exchange with at least one outflowing cold separation product, and the other air stream being supplied at a relatively high pressure and treated to reduce its temperature and pressure, the steps comprising effecting partial liquefactions of cooled air of said streams at condensation pressure to provide liquid feeds for a rectification in which the air is separated at least into an oxygen product and a nitrogen product, said partial liquefactions also producing a cold air vapor remainder; superheating said vapor remainder to a desired temperature preparatory to work expansion by heat exchange including a heat exchange with at least part of said air stream at relatively high pressure; expanding such super-heated vapor with production of external work to a lower pressure; using at least part of the refrigeration of said expansion for cooling incoming air, including effecting at least a part of said partial liquefactions of cooled air; withdrawing oxygen separation product of the rectification partly as gaseous oxygen of desired purity and partly as liquid oxygen in proportions according to demand; when the proportion of gaseous oxygen withdrawal is increased and the proportion of liquid withdrawal is reduced, passing proportionately greater amounts of the expanded vapor to the rectification; and when the proportion of gaseous oxygen withdrawal is reduced and the proportion of liquid withdrawal is increased, passing proportionately greater amounts of the expanded vapor to cool incoming air.

10. In a process for the separation of air by low temperature rectification in which air is supplied in two streams, one air stream being supplied at a condensation pressure of between 60 and 100 p. s. i. g. and cooled to low temperature by heat exchange with at least one outflowing cold separation product, and the other air stream being supplied at a relatively high pressure and treated to reduce its temperature and pressure, the steps comprising effecting partial liquefactions of cooled air of said streams at condensation pressure to provide liquid feeds for a rectification in which the air is separated at least into an oxygen product and a nitrogen product, said partial liquefactions also producing a cold air vapor remainder; superheating said vapor remainder to a desired temperature preparatory to work expansion by heat exchange including a heat exchange with at least part of said air stream at relatively high pressure; expanding such superheated vapor with production of external work to a lower pressure; using at least part of the refrigeration of said expansion for cooling incoming air, including effecting at least a part of said partial liquefactions of cooled air; withdrawing oxygen separation product of the rectification partly as gaseous oxygen of desired purity and partly as liquid oxygen in proportions according to demand; when the proportion of gaseous oxygen withdrawal is increased and the proportion of liquid withdrawal is reduced, reducing the supply pressure of said other air stream; and when the proportion of gaseous withdrawal is reduced and the proportion of liquid withdrawal is increased, increasing the supply pressure of said other air stream.

11. In a process for the separation of air by low temperature rectification in which air is supplied in two streams, one air stream being supplied at a condensation pressure of between 60 and 100 p. s. i. g. and cooled to low temperature by heat exchange with at least one outflowing cold separation product, and the other air stream being supplied at a relatively high pressure and treated to reduce its temperature and pressure, the steps comprising effecting partial liquefactions of cooled air of said streams at condensation pressure to provide liquid feeds for a rectification in which the air is separated at least into an oxygen product and a nitrogen product, said partial liquefactions also producing a cold air vapor remainder; superheating said vapor remainder to a desired temperature preparatory to work expansion by heat exchange including a heat exchange with at least part of said air stream at relatively high pressure; expanding such superheated vapor with production of external work to a lower pressure; using at least part of the refrigeration of said expansion for cooling incoming air, including effecting at least a part of said partial liquefactions of cooled air; withdrawing oxygen separation product of the rectification partly as gaseous oxygen of desired purity and partly as liquid oxygen in proportions according to demand; when the proportion of gaseous oxygen withdrawal is increased and the proportion of liquid withdrawal is reduced, keeping the total air supply substantially constant and reducing the relative amount of said other air stream; and when the proportion of gaseous oxygen withdrawal is reduced and the proportion of liquid withdrawal is increased, increasing the relative amount of said other air stream.

12. In a process for the separation of air by low temperature rectification in a multipressure cycle in which there is provided a stream of air at a condensation pressure between 60 and 100 p. s. i. g., and streams of high pressure air at pressures between 1000 and 3000 p. s. i. g., and the condensation pressure stream is cooled to a temperature close to its condensation temperature by heat exchange with suitable amounts of at least one of the separation products, the steps comprising cooling one of the high pressure streams by an expansion with production of external work to about said condensation pressure; cooling another of the high pressure streams by indirect heat exchanges including heat exchange with suitable other amounts of at least one of the separation products; expanding the cooled other high pressure streams to about said condensation pressure; subjecting all of said streams to a scrubbing with a liquid fraction at about said condensation pressure to form a scrubbed vapor; eliminating impurities from the used liquid fraction; subjecting at least part of the scrubbed vapor to liquefaction to form liquid fractions; and passing the liquid fractions to the rectification.

13. Process for the separation of air by low temperature rectification according to claim 12 which includes the steps of superheating to a desired temperature for expansion an unliquefied part of the scrubbed vapor by heat exchange with another of the high pressure streams; expanding with production of external work the superheated part of the scrubbed vapor to about the rectification pressure; and using at least the refrigeration of said expansion for effecting at least part of said liquefactions.

14. Process for the separation of air by low temperature rectification according to claim 13 in which at least part of the expanded scrubbed vapor is passed to the rectification.

15. Process for the separation of air by low temperature rectification according to claim 13 in which at least part of the expanded scrubbed vapor is passed to join the nitrogen-rich product of the rectification and heat exchange is effected between the combined expanded vapor and nitrogen product for effecting partial liquefaction of scrubbed vapor at about condensation pressure.

16. In a process for the separation of air by low temperature rectification to provide higher and lower purity oxygen products, the steps comprising collecting higher purity liquid oxygen of the rectification; boiling at least part of said liquid oxygen in an evaporator to produce a vapor in equilibrium with the boiling liquid; returning at least a portion of said vapor to the rectification at a point where the composition is substantially that of said vapor; withdrawing at a predetermined rate, a lower purity gaseous oxygen product from said rectification where the composition is substantially that of the lower purity product; withdrawing at a predetermined rate a higher purity oxygen product from said evaporator; and proportioning such withdrawal rates in accordance with respective demands for high purity oxygen and low purity oxygen and in respect to the return of vapor to the rectification.

17. Process in accordance with claim 16 in which the higher purity product is liquid withdrawn from the liquid phase, and as the high purity liquid withdrawal rate is increased, the low purity withdrawal rate is reduced to insure that the return of said vapor is adequate for the rectification.

18. Process in accordance with claim 16 in which the higher purity product is gaseous and withdrawn from the gas phase.

19. Process in accordance with claim 16 in which the higher purity product is in part liquid withdrawn from the liquid phase and in part gaseous and withdrawn from the gas phase.

20. In an apparatus for separating air by low temperature rectification, the combination of means for cooling a first stream of air at a relatively low pressure to remove moisture and carbon dioxide therefrom and cool it to a low temperature, means for cooling and reducing the pressure of a second stream of air at a relatively higher pressure to substantially the same condition as said cooled first stream, cleansing equipment adapted to receive both streams of air and partially liquefy said air for facilitating the separation of residual carbon dioxide impurity therefrom, means for superheating vapor remainder of said partial liquefaction of said air, means for work-expanding superheated vapor, rectification equipment for receiving and separating the treated air into its main constituents, and adjustable means for varying the ratio of high pressure air to low pressure air and for passing desired amounts of the expanded vapor from said work-expanding means (1) to the rectification equipment and (2) to bypass the rectification equipment as an effluent gas, so as to produce desired variously proportioned liquid and gaseous oxygen outputs from said apparatus.

21. In the apparatus recited in claim 20, said high pressure air stream cooling means comprising a heat exchanger for cooling the bulk of said high pressure air stream, and additional stage heat exchangers for further cooling one part of said high pressure air stream preparatory to reducing said one part to said low pressure condition, and an expansion device connected to receive the remaining part of said high pressure stream to be expanded with the production of external work and cooled to said same condition.

22. In an apparatus described as in claim 21, wherein one of said additional stage heat exchangers comprises said means for superheating said vapor remainder and includes a passage for passing such remainder in heat exchange with said one part of said high pressure air stream; and wherein said work-expanding means comprises a turbine expander connected to receive warmed air vapor from said one exchanger.

23. In the apparatus recited in claim 20, said cleansing apparatus comprising a scrubber unit, said scrubber unit having thermally associated therewith liquefier passages connected to conduct separated products therethrough for effecting partial liquefaction of scrubbed air.

24. In a multipressure system for separating a gas mixture by low temperature rectification which includes means for cooling a first stream of gas mixture at a condensation pressure to a low temperature with removal of condensible minor impurities therefrom, means for reducing the temperature and pressure of a second stream of gas mixture at a relatively high pressure to substantially the same condition as said first stream; and a rectification column in combination with a chamber connected to receive all of said cooled streams, collect a liquid fraction of the mixture and separate a vapor remainder; liquefier means associated with said chamber to liquefy parts of said gas mixture for forming at least part of said liquid fraction; vapor superheating means connected to receive vapor remainder for heat exchange with a portion of the second stream at high pressure; a rotary expander device connected to receive the superheated vapor from the superheating means and expand the vapor to lower pressure; and passage means effecting communication between the rotary expander and said liquefier means to use at least part of the refrigeration of the expanded vapor for cooling said liquefier means.

25. A system as defined in claim 24 in which said last mentioned passage means comprises branch passages from the rotary expander to the rectifying column and to a heat exchange passage in said liquefier means, and valve means for regulating the flow of expanded vapor through said branch passages.

26. A system as defined in claim 24 in which said means for reducing the temperature and pressure of the second stream of gas mixture comprises an expansion machine for expanding with production of external work one part of said second stream to about the condensation pressure and discharging the expanded one part to said chamber; and countercurrent heat exchanger means for cooling another part of the second stream to low temperature; and means reducing the pressure of and passing the cooled other part to said chamber.

27. A system as defined in claim 24 in which said chamber is separate from said rectifying column, and including physical means for removing impurities from the liquid fraction collected in said chamber and passing the cleaned liquid fraction to the rectifying column.

28. A system as defined in claim 24 in which said chamber is associated with the lower end of said rectifying column, the rectifying column having a boiling chamber at its lower end collecting liquid higher boiling rectification product and a boiler-condenser in the boiling chamber having its condensing side in vapor communication with said chamber; and physical means for removing impurities from the liquid fraction collected in said chamber and passing the cleaned liquid fraction to the rectifying column.

29. A system as defined in claim 28 which includes means for withdrawing a liquid higher boiling product from said boiling chamber and means for withdrawing a gaseous higher boiling product of lower higher boiling component content from said rectifying column at a point above said boiling chamber.

30. A system as defined in claim 24 in which said liquefier means includes heat exchanger passages at least one of which is connected to receive and pass a separation product of said rectifying column and to pass such product to said means for cooling the first stream of gas mixture.

31. A system as defined in claim 24 which includes compressor means for compressing the entire supply of gas mixture to said condensation pressure; means for dividing the compressed supply to form said first and second streams; and multiple compressor means of the type which is adjustable for compressing desired different amounts of said second stream to desired substantially higher pressures connected to compress said second stream to a selected high pressure and at a selected volume rate.

32. A system as defined in claim 24 which includes means for withdrawing a high purity higher boiling component product from a low point of said rectifying column and a low boiling gaseous product from a high point of said rectifying column; countercurrent heat exchanger means having a passage for cooling at least a portion of said second stream, a passage connected to receive and heat a portion of the withdrawn low boiling product, and a passage connected to receive and heat said high purity product without contamination thereof.

33. A system as defined in claim 24 which includes means for withdrawing a high purity higher boiling component product from a low point of said rectifying column and a low boiling gaseous product from a high point of said rectifying column; countercurrent heat exchanger means having a passage for cooling at least a portion of said second stream, a passage connected to receive and heat a portion of the withdrawn low boiling product; said means for cooling the first stream comprising regenerators connected to receive the balance of the withdrawn low boiling product; and heat exchange passage means associated with said regenerators connected to receive and heat said high purity product without contamination thereof.

34. A system for separating a gas mixture by low temperature rectification which comprises means for compressing the entire supply of gas mixture to a condensation pressure; means for dividing the compressed supply into first and second streams; reversing heat exchange means for eliminating condensible impurities and cooling said first stream to a low temperature by heat exchange with at least an effluent containing a large portion of the low boiling separation product; compressor means for further compressing said second stream to a desired relatively high pressure; means for dividing the compressed second stream into portions; countercurrent heat exchanger means for cooling one portion of the compressed second stream by heat exchange with outflowing products including another portion of effluent containing the low boiling separation product; means for reducing the pressure of said cooled one portion to about the condensation pressure; an expansion machine for expanding with production of external work another portion of the second stream to about said condensation pressure; a chamber connected to receive the cooled first stream, the cooled one portion, and the expanded other portion for collecting a liquid fraction of the mixture and scrubbing said streams with such liquid fraction to collect residual impurities; a rectifying column having a boiling chamber at its lower end collecting a high purity liquid containing mainly the higher boiling constituent, an upper end outlet for gaseous product containing mainly the lower boiling constituent, an outlet from the boiling chamber for high purity liquid withdrawal, an outlet for high purity gas product withdrawal, and an outlet for a lower purity gas product above the boiling chamber; a boiler-condenser associated with said boiling chamber and having its condensing side connected to receive and condense portions of scrubbed vapor from said chamber; means for collecting and transferring to the rectifying column liquid condensed by said boiler-condenser; physical means for removing impurities from the liquid fraction collected in said chamber and passing the cleaned liquid fraction to the rectifying column; a vapor superheater connected to receive a portion of the scrubbed vapor from said chamber said superheater being in heat exchange with a portion of said countercurrent heat exchanger means for heat exchange with said one portion of the second stream; a turbo-expander connected to receive and expand the superheated vapor; branch conduits for passing desired amounts of expanded vapor from the turbo-expander to the rectifying column and to join the outlet for said gaseous lower boiling product; means to select the amount passed through each branch; liquefier means associated with said chamber so as to receive scrubbed vapor for liquefaction to provide at least part of said liquid fraction, said liquefier means including a heat exchange passage connected to receive and pass an effluent including said gaseous lower boiling product, and a heat exchange passage connected to receive and pass at least one of the higher boiling products; and heat exchange means for warming the gaseous higher boiling products of the rectification by heat exchange with at least one of the first and second streams of gas mixture.

References Cited in the file of this patent
UNITED STATES PATENTS

| | | |
|---|---|---|
| 2,048,076 | Linde | July 21, 1936 |
| 2,287,158 | Yendall | June 23, 1942 |
| 2,514,391 | Haynes | July 11, 1950 |
| 2,619,810 | Rice et al. | Dec. 2, 1952 |
| 2,663,167 | Collins | Dec. 22, 1953 |